(12) United States Patent
Baker et al.

(10) Patent No.: US 8,856,665 B2
(45) Date of Patent: Oct. 7, 2014

(54) SETTING USER-PREFERENCE INFORMATION ON THE CONFERENCE BRIDGE

(75) Inventors: Al Baker, Brick, NJ (US); Mehmet C. Balasaygun, Freehold, NJ (US); Matt Jerome Stevens, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 706 days.

(21) Appl. No.: 12/428,975

(22) Filed: Apr. 23, 2009

(65) Prior Publication Data

US 2010/0275134 A1    Oct. 28, 2010

(51) Int. Cl.
G06F 3/048    (2013.01)
H04N 7/14     (2006.01)
H04M 3/56     (2006.01)
H04M 3/42     (2006.01)

(52) U.S. Cl.
CPC ............ *H04N 7/147* (2013.01); *H04M 3/567* (2013.01); *H04M 3/42068* (2013.01)
USPC .................................... 715/753; 379/202.01

(58) Field of Classification Search
USPC .............................. 715/753; 379/202, 202.01
See application file for complete search history.

(56) References Cited

U.S. PATENT DOCUMENTS

| | | | | |
|---|---|---|---|---|
| 5,631,904 | A * | 5/1997 | Fitser et al. ................... | 370/261 |
| 6,044,403 | A * | 3/2000 | Gerszberg et al. ............. | 709/225 |
| 6,909,708 | B1 * | 6/2005 | Krishnaswamy et al. ..... | 370/352 |
| 6,925,065 | B1 * | 8/2005 | Roy ................................ | 370/260 |
| RE39,717 | E * | 7/2007 | Yates et al. .................... | 709/201 |
| 7,487,096 | B1 * | 2/2009 | Cox et al. ....................... | 704/277 |
| 7,728,845 | B2 * | 6/2010 | Holub ............................. | 345/589 |
| 7,876,714 | B2 * | 1/2011 | Ethier et al. ................... | 370/260 |
| 7,933,248 | B2 * | 4/2011 | Hong et al. .................... | 370/332 |
| 8,208,000 | B1 * | 6/2012 | Swanson et al. ............ | 348/14.08 |
| 2001/0038033 | A1 * | 11/2001 | Habib ............................ | 235/375 |
| 2003/0108001 | A1 * | 6/2003 | Roy ................................ | 370/260 |
| 2003/0236835 | A1 * | 12/2003 | Levi et al. ...................... | 709/204 |
| 2004/0047461 | A1 * | 3/2004 | Weisman et al. ......... | 379/202.01 |
| 2004/0061718 | A1 * | 4/2004 | Fitzpatrick et al. ............ | 345/758 |
| 2005/0286711 | A1 * | 12/2005 | Lee et al. .................. | 379/399.01 |
| 2006/0133585 | A1 * | 6/2006 | Daigle et al. ................ | 379/88.06 |
| 2006/0294186 | A1 * | 12/2006 | Nguyen et al. ................ | 709/204 |
| 2007/0046456 | A1 * | 3/2007 | Edwards et al. ............ | 340/539.1 |
| 2007/0123236 | A1 * | 5/2007 | Rey et al. ................... | 455/414.4 |
| 2007/0281723 | A1 * | 12/2007 | Chotai et al. .................. | 455/518 |
| 2008/0059578 | A1 * | 3/2008 | Albertson et al. ............. | 709/204 |
| 2008/0151785 | A1 * | 6/2008 | Sylvain .......................... | 370/260 |
| 2009/0019367 | A1 * | 1/2009 | Cavagnari et al. ............ | 715/716 |

(Continued)

OTHER PUBLICATIONS

U.S. Appl. No. 12/243,142, filed Oct. 1, 2008, Michaelis.

*Primary Examiner* — Omar Abdul-Ali
*Assistant Examiner* — Anil Bhargava
(74) *Attorney, Agent, or Firm* — Sheridan Ross P.C.

(57) ABSTRACT

User-preference information is utilized in conjunction with a conference bridge for the purpose of customizing the receiving of text data, alerts, or other associated information. These settings can be stored in a media file, or a set of data that is kept on an endpoint, such as a conference-enabled endpoint or it can be a configuration of data maintained by one or more conference bridges. This user preference information can specify various preferences such as language, font, phone capabilities, phone number associated with a conference, video conferencing capabilities, preferences for rendering images, multi-media content preferences, whiteboard resolution, volume, and in general, any preference associated with any application or data associated with a conference.

20 Claims, 2 Drawing Sheets

(56) References Cited

U.S. PATENT DOCUMENTS

2009/0316870 A1* 12/2009 Wise et al. .............. 379/202.01
2010/0066808 A1* 3/2010 Tucker et al. .............. 348/14.09
2010/0149302 A1* 6/2010 Malik ........................ 348/14.08

* cited by examiner

SETTING USER-PREFERENCE INFORMATION ON THE CONFERENCE BRIDGE

FIELD OF THE INVENTION

Exemplary aspects of this invention relate to communication preferences. More specifically, an exemplary embodiment of the invention is directed toward user preferences for video conferencing.

BACKGROUND OF THE INVENTION

Video conferencing usually includes a plurality of telecommunication technologies which allow two or more locations to interact via two-way video and audio transmission simultaneously. One core technology used for video conferencing is compression of audio and video streams that allow more optimized performance for real-time collaboration. Other core components include a video input, such as video camera or webcam, video output, such as a computer monitor, television, projector, or the like, one or more audio inputs such as microphones, one or more audio outputs such as a loud speaker, headset, or the like, and one or more networks and links connecting the parties, such as a LAN or the Internet. Typically these various components are either part of a dedicated system (that usually includes a console and TV) or a desktop system, such as a PC-based system.

SUMMARY OF THE INVENTION

While the above-described systems provide basic conferencing functionality, users are not able to utilize preferences to assist with usability of the conference.

Accordingly, one exemplary embodiment of the present invention provides the ability to establish user-preference information on the conference bridge for the purpose of receiving text data, alerts, or other associated information. These settings can be, as described hereinafter, a media file, or a set of data that is kept on an endpoint, such as a conference-enabled endpoint or it can be a configuration of data maintained by one or more conference bridges. This user preference information can specify various preferences such as language, font, phone capabilities, phone number associated with a conference, video conferencing capabilities, preferences for rendering images, multi-media content preferences, whiteboard resolution, volume, and in general, any preference associated with any application or data associated with a conference.

The user-preference information can be in a profile that is either manually or automatically selectable, for example, at the onset of a conference and based on an identifier, such as a caller ID, or, for example, based on the endpoint in use by a conference attendee.

In accordance with a first exemplary embodiment, a video conference is initiated with a number of users located at PC-based conference endpoints. As users join the conference, a check is made to determine whether user preferences, stored in a profile, are associated with one or more of the conference participants. This profile could be stored either on a conference bridge or on the endpoint itself. Therefore, for example, when it is determined that user-preferences will be used to regulate certain aspects of a conference, one or more of the conference bridge and a module associated with the endpoint can ensure the conference is setup and run with those preferences.

In accordance with another exemplary embodiment, a video conference is initiated with a number of users located at PC-based conference endpoints, and one user on a mobile device, such as a PDA. The user at the mobile device, upon joining the conference can either manually or automatically have recognized their preferences for the conference. For example, knowing that the mobile-users endpoint is both bandwidth and processor limited, the user could specify, for example, a certain codec for use with the conference, indicate that white boarding is not available, and that the volume should be set at "high." This profile information could be stored either on a conference bridge or on the endpoint itself. Therefore, for example, when it is determined that user-preferences will be used to regulate certain aspects of a conference, one or more of the conference bridge and a module associated with the endpoint can ensure the conference is setup with those preferences.

While for this particular exemplary embodiment it may be preferable to have the conference bridge recognize and customize the conference for the mobile user since the mobile user is on a bandwidth and processor-limited device, it should be appreciated that in accordance with another exemplary embodiment, one or more of the conference bridge and endpoint can be used to tailor user preferences for a customized experience. For example, while certain aspects of the conference may be more easily customized on the conference bridge, such as which codec to use, preferences such as volume, font, color scheme, screen layout, whiteboard resolution, or the like, may be more aptly handled by the endpoint. Furthermore, a module could be present that works in conjunction with the user profile (that stores the user preference information) to discover the capabilities of the endpoint. For example, this module could interrogate an endpoint, such as a PC, and determine whether there are specific applications present, such as applications that support white boarding, different languages, or in general any application that may have been requested during the conference setup.

In accordance with another exemplary operational embodiment, the various user preferences can be one or more of monitored by the conference moderator and/or overridden by the conference moderator. For example, in a remote-classroom type conference embodiment, it may be preferable to limit the customizability of one or more characteristics of the conference at a particular endpoint. A moderator could be provided an interface that allows the various preferences requested by each of the users to be displayed with an optional interface provided that allows the moderator to override one or more of these preferences. This overriding could be performed automatically or manually in accordance with, for example, a "master profile" associated with the conference by the moderator. In addition, a hardware-based "master profile" could be associated with the conference that limits customizability based on one or more limitations of any endpoint within the conference environment and/or bandwidth availability.

In accordance with yet another exemplary embodiment, one or more of the user profiles could specify what specific type of functionality they would like for a conference. For example, assume a plurality of users are setting up a conference where they would like to have a white boarding application. Upon reconciliation of the various users' profile information, and for example in conjunction with a module that interrogates the capabilities of each endpoint, it could be determined that no white boarding application is available for the conference attendees. At that point, the conference bridge could invoke a shared whiteboard application that could be available to the various conference attendees at, for example, an additional charge. The conference attendees could elect whether or not they would like to use the shared whiteboard application which would be hosted by the conference bridge. This basic concept could be extended to any application that could be used in conjunction with a video conference cooperate with the basic functionality of the present invention.

In accordance with the exemplary master-profile embodiment, the master-profile need not regulate all aspects of the conference environment, but could regulate only a portion thereof. Therefore, for example, on the preferences which are not regulated by the master-profile, these preferences could be regulated by user-specific preferences. Similarly, the master-profile could include a range of selectable options that, when they coincide with specific user preferences, allow user customization within that range.

Creation of the user-preference profile could be managed by a preference management module that provides an interface which allows selective customization of one or more features associated with a particular user. While it may be preferable to specify preference information based on a particular endpoint, it should be appreciated that a user may have a plurality of profiles based on the particular endpoint(s) typically used while on a conference. It should also be appreciated that these preferences need not necessarily be user-specific, but could also be endpoint specific. For example, in a dedicated video conference endpoint, that includes a large screen TV, pan-tilt-zoom camera, loud speakers, amplifier, etc., profile could be associated with this endpoint to assist with, for example, setup of the various equipment for a conference.

Aspects of the invention thus relate to conferencing preferences.

Still further aspects of the invention relate to video conferencing preferences.

Additional aspects of the invention relate to one or more of user and endpoint preferences in a video-conferencing environment.

Still further aspects of the invention relate to reconciliation of specific user preferences with a master preferences profile.

Still further aspects of the invention relate to the creation and management of user preferences on one or more of a conference bridge and endpoint.

Still further aspects of the invention relate to controlling one or more conference functions based on information stored in a user profile.

Additional aspects of the invention further relate to invoking an application, such as a shared application, based on preference information.

Still further aspects of the invention relate to supplementing a conference cost based on a request for additional functionality, such as a shared application.

Even further aspects of the invention relate to adjusting one or more video conferencing characteristics based on preference information, wherein these characteristics include one or more of language, font, resolution, volume, microphone volume, speaker volume, endpoint volume, and the like. For endpoint volume, for example, a user could specify that the volume for one or more of the other conference attendees could be played more loudly on their endpoint than another conference attendee.

Even further aspects of the invention relate to selecting a particular feed based on the user preferences. For example, the system could recognize that for an all group meeting held every Tuesday, the user always wants to see the video feed not from the moderator, but rather from conference attendee number two—this information could be stored in the user's profile.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other network protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be described below in relation to a communications environment. Although well-suited for use with circuit-switched and packet-switched networks, the invention is not limited to use with any particular type of communication system or configuration of system elements and those skilled in the art will recognize that the disclosed techniques may be used in any application in which it is desirable to provide secure communications between endpoints. While the various endpoints described herein can be any communications device, such as a telephone, speakerphone, cellular phone, SIP-enabled endpoint, soft phone, PDA, wired or wireless communication device, video conferencing hardware/software, or in general any communications device that is capable of sending and/or receiving communications.

The exemplary systems and methods of this invention will also be described in relation to software, modules and associated hardware and network(s). However, to avoid unnecessarily obscuring the present invention, the following description emits well known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
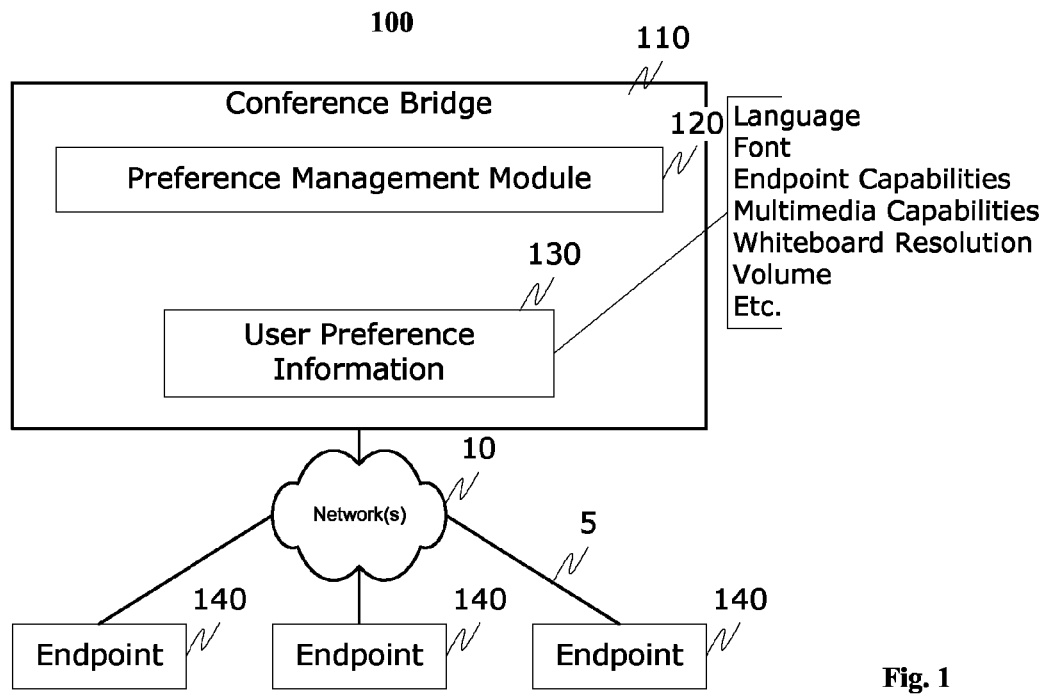
FIG. 1 illustrates an exemplary bridge-centric embodiment according to this invention.

FIG. 1 illustrates an exemplary bridge-centric conference environment 100. Environment 100 includes a conference bridge 110, a preference management module 120, user preference information 130, and endpoints 140, that are connected to the conference bridge 110 via one or more networks 10 and links 5. The conference bridge 100 handles basic conference functionality such as setup, management, billing and termination. Cooperating with the conference bridge 110 is the preference management module 120 and the user preference information 130. More specifically, the preference management module 120 provides functionality such as the creation and management of user preferences, that can be stored in a profile, as well as functionality including interrogation and preference reconciliation.

In operation, one or more of the endpoints 140 initiate a conference with one or more other endpoints via the conference bridge 110. As discussed, the selection of preference information can be done either automatically, manually, or some combination thereof. Therefore, one or more of the endpoints 140 may have preference information associated therewith stored in the user preference information 130. The identification of this user preference information can be based on one or more of an endpoint identifier, caller ID information, video conference ID information, user name, and/or selectable by a user at endpoint 140.

Additionally, if a user and/or endpoint 140 does not have associated therewith preference information, the preference management module 120 can query the user at the endpoint as to whether they would like to establish preference information. If so, the preference management module 120 can provide an interface to allow the user to select preferences for any aspect of the conference, such as language preferences, font preferences, endpoint capabilities, multimedia capabilities, whiteboard preferences, volume preferences, or in general any preference associated with one or more of the user, endpoint and conference.

Once the user preferences have been established and/or selected, the preference management module 110, based on the user preference information 130, regulates one or more functions of the conference bridge 110 and participating endpoints 140. As discussed, preference management module 120 can also reconcile conflicting preferences either between endpoints or between an endpoint and the conference bridge 110 with reference to a master profile that, for example, specifies certain features, capabilities, or preferences that cannot be overridden, or that are only selectable within a specific range.

For example, if the conference bridge 110, such as a video conference bridge, only supports up to a certain bandwidth of video streaming, and user preference information requests a higher bandwidth, the preference management module 120 can override this conflicting preference request and automatically select the conference bridges highest capability as the user preference.

In a similar manner, if preference information specifies preferences for a particular application, which may not be available on one or more of the other participating endpoints, the conference bridge 110, in cooperation with the preference management module 120, can spawn a shared version of, for example, an application specified in the preference information that can be used for the conference. One exemplary embodiment is user preference information associated with a whiteboard which may or may not be available to all conference attendees. This whiteboard application could be spawned and run from the conference bridge 110 thereby sharing white boarding capability between the endpoints 140.

Additional functionality associated with the preference management module 120 provides the ability to continuously monitor and update preference information as one or more of functionality, endpoint capabilities, bandwidth, or in general any aspect of the conference environment changes during an ongoing conference. For example, if a new shared application is invoked mid-way through a conference, and preference information is associated with this newly initiated application, the user preferences can dictate how that new application is presented to a user associated with that endpoint. This dynamic ability to associate user preferences with a conference can continue throughout the conference and even apply to how the conference session is wrapped-up.

Preferences associated with the wrapping-up of a conference session include billing preferences, and the ability to update user preferences based on, for example, changes made during the conference itself. Furthermore, an interface can be provided to a user that allows the preferences used during a conference to be saved in a new profile that can be associated with that particular conference. For example, and as discussed above, the preferences can be associated with a profile or a group meeting that occurs every Tuesday.

Figure 2:
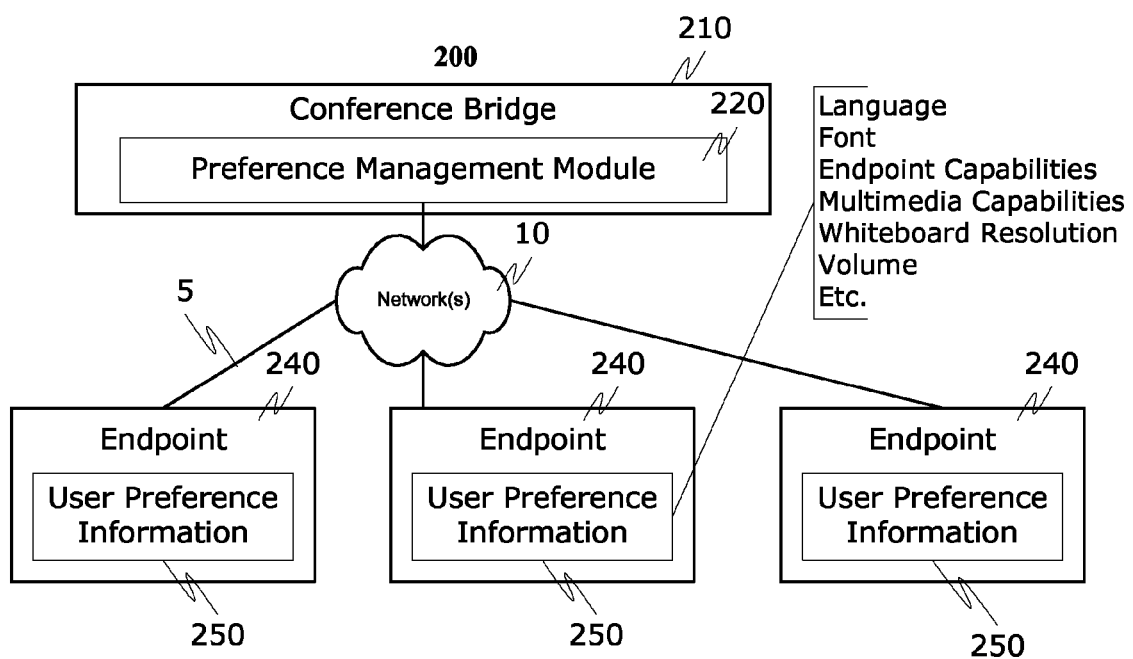
FIG. 2 illustrates an exemplary endpoint-centric embodiment according to this invention.

FIG. 2 illustrates an exemplary endpoint-centric conference environment 200. The endpoint-centric conference environment 200 includes a conference bridge 210, a preference management module 220, and one or more endpoints 240 connected via network 10 and link 5 to the conference bridge 210. Each of the endpoints 240 can include user preference information 250. Operation of the endpoint-centric conference environment 200 is similar to that described above in relation to the bridge-centric conference environment 100. However, for the endpoint-centric environment 200, the user preference information is stored on one or more of the endpoints 240 as user preference information 250. This user preference information can be accessed by the preference management module 220 and/or retrieved by the preference management module 220 and stored in a cache or comparable memory on the conference bridge 210. Although not illustrated, it should be appreciated that a hybrid environment would work comparably well with the teachings of this invention where one or more endpoints has associated therewith user preference information and other endpoints utilized user preference information associated with the conference bridge. With either scenario, the preference information can be accessed and utilized to control preferences associated with an ongoing conference.

As discussed, the user preference information 250 can generally govern any aspect of the conference. Exemplary characteristics that can be covered by this information include billing preferences, language and display preferences, font and font size characteristics, volume information, audio equalizer preferences, whiteboard resolution, font, and marker color preferences, multimedia capability and preferences, endpoint capabilities and preferences, connectivity preferences, such as bandwidth capabilities, available applications, and the like. As discussed, the preference management module 220 could also invoke an interrogation module that allows detection of capabilities associated with the one or more endpoints 240 active in a conference.

Additionally, the user preference information need not necessarily be stored on either the endpoint or the conference bridge, but could be stored as a file, for example, on any storage device such as a personal computer. Upon initiation of a conference, the conference bridge with the cooperation of the preference management module could query one or more of the endpoints to ask them whether presence information that is stored in a profile should be associated with the requested conference. The user could point the preference management module to a location where the file is stored. In a similar manner, user preference information could itself include a pointer to where a users profile resides. Therefore, for example, upon receiving a request for a conference, the conference bridge could begin setting up the conference and recognize, automatically, a specific user based on an identifier. This identifier could have associated therewith a pointer to where a profile resides that includes the user preference information. This profile could further include multiple sets of user preference information that could be selected, for example, based on particular pre-established conferences. Therefore, for example, if the user has requested a conference for the weekly team meeting, a specific user's preferences for that particular conference could be retrieved from the user's profile. Similarly, if the conference request is for an "all hands" conference, the user preferences for that particular conference could also be selected. Additionally, the profile could include information as to whether or not the user is the moderator. As discussed, the moderator may have an overriding set of preferences that may limit or otherwise govern the ability of other users within the conference environment to specify or set preferences associated with their particular endpoint.

Figure 3:
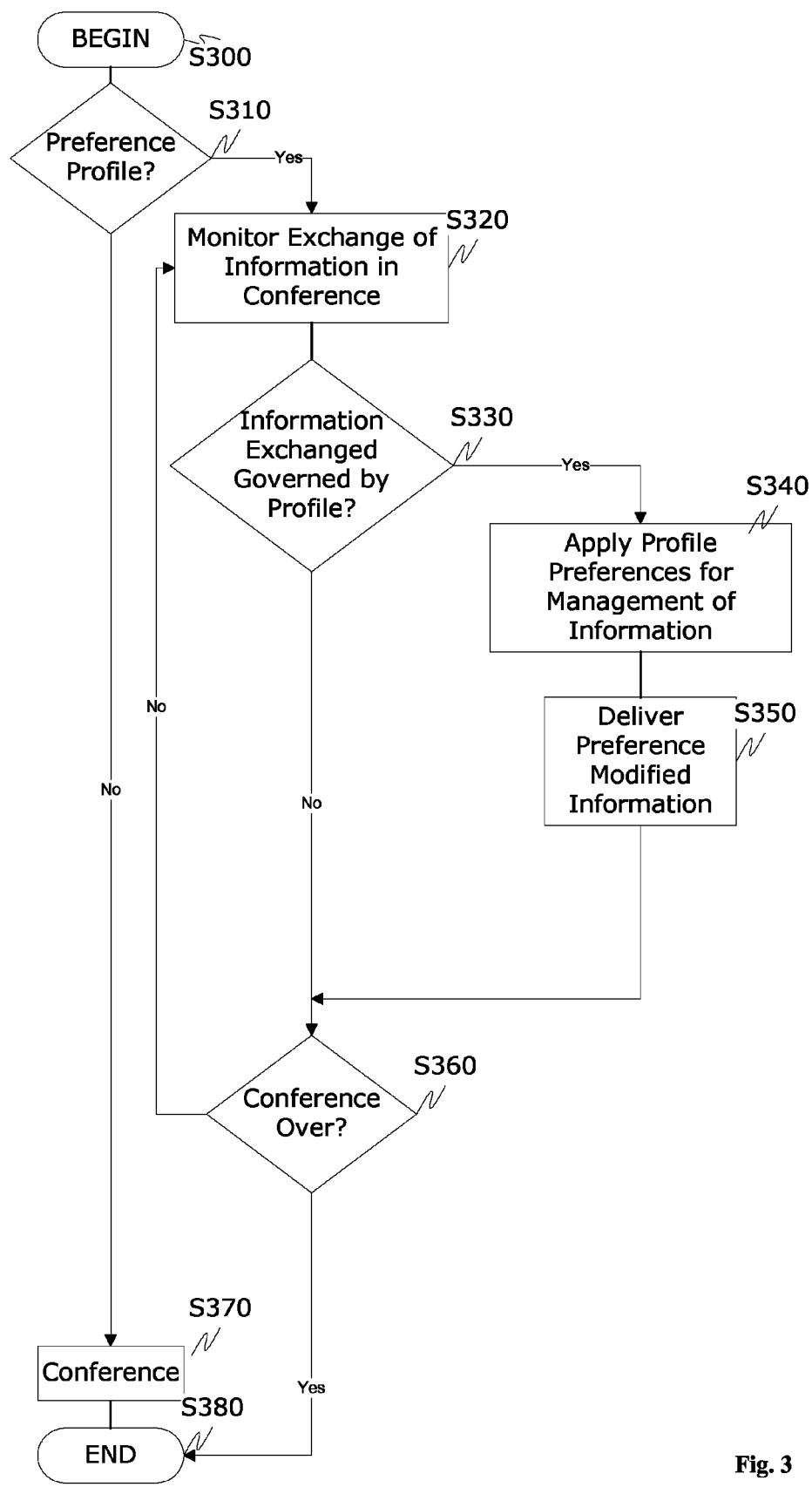
FIG. 3 outlines an exemplary method for managing preference information for a conference, such as a video conference according to this invention.

FIG. 3 outlines an exemplary method of operation of a conference environment. In particular, control begins at step S300 and continues to step S310. In step S310, a determination is made whether one or more profiles are associated with a user or endpoint. If a particular user or endpoint does not have an associated profile, control jumps to step S370 where the conference proceeds. Otherwise, control continues to step S320. Optionally, even if user doesn't have his/her own profile, a default profile for the particular conference bridge created for the conference bridge can still be applied to the user. In addition, depending on the type of user joining the conference (based on device bandwidth/user's group, etc.), there may be multiple default profiles applied to different participants.

If one or more profiles are associated with one or more of users and endpoints in step S310, the preferences associated with those profiles are loaded and a determination is made whether preferences conflict or are overridden by, for example, a master profile. Once conflicting preferences and/or master profile preferences are taken into account and user preferences updated to comply therewith, in step S320 the conference is monitored for information governed by preference. Next, in step S330, if the exchanged information is governed by one or more preferences, control continues to step S340. Otherwise, control jumps to step S360.

In step S340, the preferences are applied to the exchanged information. Then, in step S350, the information is received at the endpoint having the preference information associated therewith having modified the information. Control then continues to step S360 where a determination is made whether the conference is over. If the conference is not over control jumps back to step S320, with control otherwise continuing to step S380, where the control sequence ends.

In accordance with another exemplary embodiment, the various features and benefits associated with user preference information governing one or more aspects of a conference could also be extended to setting up a conference. For example, the preference information could specify a time, date, and conference participants, in addition to user preferences, for an upcoming conference. This information could be associated with an "invite" in a calendaring application such as Outlook®. Therefore, on the specified time and date being reached, the conference session could automatically be initiated based on information in the profile such as attendees, and further refined based on user preferences associated with that particular conference endpoint. Therefore, the general concept of user preferences as is discussed herein could at least be applied to a particular conference, a particular endpoint, a series of conferences, a conference on a specific time and/or date and/or annually or automatically selected based on one or more of an identifier associated with a user, caller ID, conference ID, endpoint capabilities, endpoint interrogation, or the like.

A number of variations and modifications of the invention can be used. It would be possible to provide or claims for some features of the invention without providing or claiming others.

The exemplary systems and methods of this invention have been described in relation to conference preferences and management. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system co-located, certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a media server, conference bridge, video conference bridge, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), video conference systems, and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a computer-readable storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated conference system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method of managing a multimedia conference comprising:
   establishing and storing, in a memory, before commencement of the multimedia conference, a plurality of profiles corresponding to a plurality of individual users, each profile including user preference information of an individual user of the plurality of individual users, wherein at least one of the plurality of profiles is on an endpoint of one of the plurality of individual users, wherein the at least one of the plurality of profiles on the endpoint of the one of the plurality of individual users contains preference information for an application on the endpoint of the one of the plurality of individual users, and wherein the application is not on another endpoint of another one of the plurality of individual users;
   accessing the previously stored plurality of profiles, including the user preference information of the plurality of individual users;
   applying the user preference information from the plurality of profiles of the plurality of individual users to one or more of functionality of the multimedia conference and operation of an endpoint, the user preference information from the plurality of profiles of the plurality of individual users being limited based on a master profile associated with the multimedia conference;
   displaying, by one or more processors, the user preference information from the plurality of profiles of the plurality of individual users that were stored before the commencement of the multimedia conference for display to a moderator, wherein the moderator overrides at least one preference included in at least one of the user preference information of the plurality of individual users;
   monitoring, by the one or more processors, the multimedia conference, endpoint capabilities and bandwidth, and dynamically updating the one or more of the functionality of the multimedia conference and the operation of the endpoint throughout the multimedia conference, wherein the stored plurality of profiles can be used for one or more additional multimedia conferences;
   determining that the application is not running on the other endpoint of the other one of the plurality of individual users; and
   in response to determining that the application is not running on the other endpoint of the other one of the plurality of individual users, spawning and running the application at a conference bridge.

2. The method of claim 1, further comprising using the user preference information from the plurality of profiles of the plurality of individual users to initiate the multimedia conference.

3. The method of claim 1, further comprising reconciling differences between the user preference information from the plurality of profiles of the plurality of individual users and the master profile.

4. The method of claim 1, further comprising reconciling differences between the user preference information from the plurality of profiles of the plurality of individual users and another user's preference information.

5. The method of claim 1, wherein the plurality of profiles are stored on one or more of a conference bridge, the endpoint and another storage device.

6. The method of claim 1, further comprising interrogating one or more of the endpoint and a conference bridge to determine the capabilities thereof and reconciling the capabilities with one or more of the plurality of profiles.

7. The method of claim 1, wherein the user preference information from the plurality of profiles of the plurality of individual users includes one or more of billing preferences, language and display preferences, font and font size characteristics, volume information, audio equalizer preferences, whiteboard resolution, font, marker color preferences, multimedia capabilities and preferences, the endpoint capabilities and preferences, connectivity preferences, bandwidth capabilities, available applications, video preferences, multimedia preferences, screen layout, skin preferences, color scheme preferences, initial setup preferences, user preferences and scheduling preferences.

8. The method of claim 1, further comprising initiating the multimedia conference based on information stored in the plurality of profiles.

9. The method of claim 1, further comprising:
   electing, by the other one of the plurality of users, whether the other one of the plurality of users would like to use the application at the conference bridge.

10. A non-transitory computer-readable storage media including processor-executable instructions that when executed on the one or more processors performs the steps in claim 1.

11. A multimedia conference system comprising:
    a plurality of profiles, including user preference information of a plurality of individual users, wherein the plurality of profiles are established and stored in a memory on at least one of a conference bridge, and an endpoint before commencement of the multimedia conference, wherein at least one of the plurality of profiles is on an endpoint of one of the plurality of individual users, wherein the at least one of the plurality of profiles on the endpoint of the one of the plurality of individual users contains preference information for an application on the endpoint of the one of the plurality of individual users, and wherein the application is not on another endpoint of another one of the plurality of individual users;

a processor enabled preference management module that applies the user preference information from the plurality of profiles of the plurality of individual users to one or more of functionality of a multimedia conference and operation of the endpoint, the user preference information from the plurality of profiles of the plurality of individual users being limited based on a master profile associated with the multimedia conference, that displays the user preference information from the plurality of profiles of the plurality of individual users, that were stored before the commencement of the multimedia conference, on a display that receives input from the moderator that overrides at least one of the user preference information of the plurality of individual users, monitors the multimedia conference, endpoint capabilities and bandwidth, dynamically updates the one or more of the functionality of the multimedia conference and the operation of the endpoint throughout the multimedia conference, wherein the stored plurality of profiles can be used for one or more additional multimedia conferences, determines that the application is not running on the other endpoint of the other one of the plurality of individual users, and in response to determining that the application is not running on the other endpoint of the other one of the plurality of individual users, spawns and runs the application at a conference bridge.

12. The system of claim 11, wherein the preference management module uses the user preference information of the plurality of individual users in the plurality of profiles to initiate the multimedia conference.

13. The system of claim 11, wherein the preference management module reconciles differences between the user preference information from the plurality of profiles of the plurality of individual users and the master profile.

14. The system of claim 11, wherein the preference management module reconciles differences between the user preference information from the plurality of profiles of the plurality of individual users and another user's preference information.

15. The system of claim 11, wherein the plurality of profiles are stored on one or more of the conference bridge, the endpoint and another storage device.

16. The system of claim 11, further comprising an interrogation module that interrogates one or more of the endpoint and the conference bridge to determine the capabilities thereof and reconciles the capabilities with one or more of the plurality of profiles.

17. The system of claim 11, wherein the user preference information from the plurality of profiles of the plurality of individual users includes one or more of billing preferences, language and display preferences, font and font size characteristics, volume information, audio equalizer preferences, whiteboard resolution, font, marker color preferences, multimedia capabilities and preferences, the endpoint capabilities and preferences, connectivity preferences, bandwidth capabilities, available applications, video preferences, multimedia preferences, screen layout, skin preferences, color scheme preferences, initial setup preferences, user preferences and scheduling preferences.

18. The system of claim 11, wherein the multimedia conference is initiated based on information stored in the plurality of profiles.

19. The system of claim 11, wherein the processor enabled preference management module is further configured to detect an election by the other one of the plurality of users whether the other one of the plurality of users would like to use the application at the conference bridge.

20. A multimedia conference system including:
a processor enabled multimedia conference bridge;
one or more processor enabled endpoints; and
user preference information associated with a plurality of endpoints and plurality of users, each user preference information being stored in a respective user profile stored in a memory, each user preference information used to control one or more characteristics of a multimedia conference based on monitoring of the multimedia conference, endpoint capabilities and bandwidth, each user preference information being limited based on a master profile associated with the multimedia conference, each user preference information established and stored before commencement of the multimedia conference, wherein the stored user preference information from the plurality of profiles of the plurality of users can be used for one or more additional multimedia conferences, wherein the user preference information from the plurality of profiles of the plurality of users, that were stored before the commencement of the multimedia conference, is displayed to a moderator, and wherein the moderator overrides at least one preference included in the user preference information from the plurality of profiles of the plurality of users, wherein at least one of the plurality of profiles is on an endpoint of one of the plurality of users, wherein the at least one of the plurality of profiles on the endpoint of the one of the plurality of users contains preference information for an application on the endpoint of the one of the plurality of users, wherein the application is not on another endpoint of another one of the plurality of users, wherein the conference bridge determines that the application is not running on the other endpoint of the other one of the plurality of users, and in response to determining that the application is not running on the other endpoint of the other one of the plurality of users, the conference bridge spawns and runs the application.

* * * * *